United States Patent [19]

McGovern

[11] Patent Number: 5,163,798
[45] Date of Patent: Nov. 17, 1992

[54] BASE SHEET FASTENER-PLATE ASSEMBLY

[75] Inventor: Hubert T. McGovern, Westfield, Mass.

[73] Assignee: Olympic Manufacturing Group, Inc., Agawam, Mass.

[21] Appl. No.: 834,001

[22] Filed: Feb. 11, 1992

[51] Int. Cl.⁵ .................... F16B 15/00; F16B 15/02
[52] U.S. Cl. ................................ 411/448; 411/463; 411/479; 411/482
[58] Field of Search .................... 411/446–448, 411/462, 463, 469, 471, 479–482, 477, 478, 533

[56] References Cited

U.S. PATENT DOCUMENTS

| | | | |
|---|---|---|---|
| 3,710,672 | 1/1973 | Hallock | 411/479 |
| 3,812,817 | 5/1974 | Hallock, Jr. | 411/479 |
| 4,031,802 | 6/1977 | Hallock | 411/479 |
| 4,213,373 | 7/1980 | Hallock | 411/448 |
| 4,641,471 | 2/1987 | Young et al. | 411/448 |
| 4,641,472 | 2/1987 | Young et al. | 411/448 |

Primary Examiner—Neil R. Wilson
Attorney, Agent, or Firm—Chilton, Alix & Van Kirk

[57] ABSTRACT

A fastener-plate assembly for use in anchoring covering sheets to a roof deck has a pre-assembled configuration. The assembled configuration is maintained by projections on an upper portion of the fastener shank. The projections engage against a received retainer plate to retain the plate to the shank of the fastener.

12 Claims, 1 Drawing Sheet

BASE SHEET FASTENER-PLATE ASSEMBLY

Background of the Invention

This invention relates generally to fasteners employed to fasten a covering material to a light weight base material such as conventionally employed on roofing decks. More particularly, the present invention relates to sheet metal type fasteners which employ a pair of interfitting generally U-shaped legs hinged to an enlarged retaining head wherein at least one of the legs is deflected outwardly upon driving the fastener into the base material.

In the roofing construction trades, nail-like fasteners formed from a metal sheet are conventionally employed for attaching covering material to insulating materials of a roof deck. Conventionally, a poured light weight roofing deck material of vermiculite, perlite, gypsum or other similar materials receives the fasteners before the insulating roof materials are completely set. The fasteners are employed to secure plies or membranes of roofing, felt, paper and similar materials to prevent the materials from being blown off of the base roofing material before the base material is sufficiently hardened. Asphalt may be applied to the plies and additional plies mounted to form a built-up roof construction.

The conventional sheet metal fasteners to which the invention relates are constructed so that as the fastener is driven into the base material, at least one of the legs is driven outwardly in a deflection-type arrangement for gripping the base material. Base fasteners to which the invention relates have incorporated a wide variety of configurations and improvements. Listed below by patentee and U.S. Pat. No. are various patents which disclose conventional base fasteners for roofing deck applications as previously referenced.

| Patentee | U.S. Pat. No. |
| --- | --- |
| R. L. Hallack | 3,466,967 |
| Hallack | 3,878,756 |
| Hallack, Jr. | 3,812,817 |
| Hallack | 4,031,802 |
| Wright | 4,043,246 |
| Hallack | 4,213,373 |
| Young et al | 4,627,207 |
| Young et al | 4,641,471 |
| Young et al | 4,641,472 |

SUMMARY OF THE INVENTION

Briefly stated, the invention in a preferred form is a base sheet fastener-plate assembly comprising a fastener and a retainer plate which are pre-assembled and are employed for securing light weight roof covering sheets to a cementious roofing deck base. The assembly includes a fastener plate which defines a substantially rectangular opening. The fastener includes a head and a pair of legs which are integrally hingably connected to the head. The legs may include a pair of side panels extending from a back panel so as to form a substantially U-shaped section which forms a channel. The legs overlap in the unactuated configuration to form a tubular shank. The legs have a contoured distal portion and an angular side configuration so that at least one of the legs is forced apart as the fastener is driven into the base material. The fastener is pre-assembled to the retainer plate so that the legs extend through the plate opening. At least one of the side panels has an integral protrusion which is engageable against the opening defining portions of the plate so as to retain the fastener with the plate.

In a preferred embodiment, one of the legs includes side panels having a pair of opposed integral dimple-like protrusions. The protrusions engage edge portions of the rectangular opening of the plate to secure the retainer plate and fastener in a pre-assembled relationship. The retaining protrusions may also take the form of barbs which are punched into the fastener legs. The protrusions and barbs are disposed at an upper portion of the legs and are generally spaced from the retainer head by a distance which exceeds the thickness of the retainer plate by an amount sufficient to allow limited axial movement of the retainer plate.

An object of the invention is to provide a new and improved base sheet fastener-plate assembly.

Another object of the invention is to provide a new and improved fastener-plate assembly wherein the fastener and plate may be pre-assembled in an efficient manner.

A further object of the invention is to provide a new and improved base sheet fastener-plate assembly which incorporates an efficient and relatively low cost means for securing a plate and sheet metal-type fastener in pre-assembled relationship prior to mounting to a roof base.

Other objects and advantages of the invention will become apparent from the drawings and the detailed description.

DETAILED DESCRIPTION OF THE PREFERRED EMBODIMENT

With reference to the drawings wherein like numerals represent like parts throughout the figures, a base sheet fastener-plate assembly in accordance with the present invention is generally designated by the numeral 10. The fastener-plate assembly 10 comprises fastener 12 and an associated retainer plate 14 which are pre-assembled in coupled relationship. The fastener-plate assembly 10 is especially adapted for fastening sheets of water proofing material to a poured roof deck so as to form a built-up waterproof covering comprising several plies of sheet material which are alternately bonded together by hot asphalt. In the preferred application, the fastener 12 is inserted through the base ply (not illustrated) and forced into the cementious roofing material (not illustrated) before the material hardens so as to anchor the base ply to the roof. The retainer plate 14 engages against the top surface of the base ply, and the fastener 12 deflectively expands to grip the roof decking material.

Figure 4:
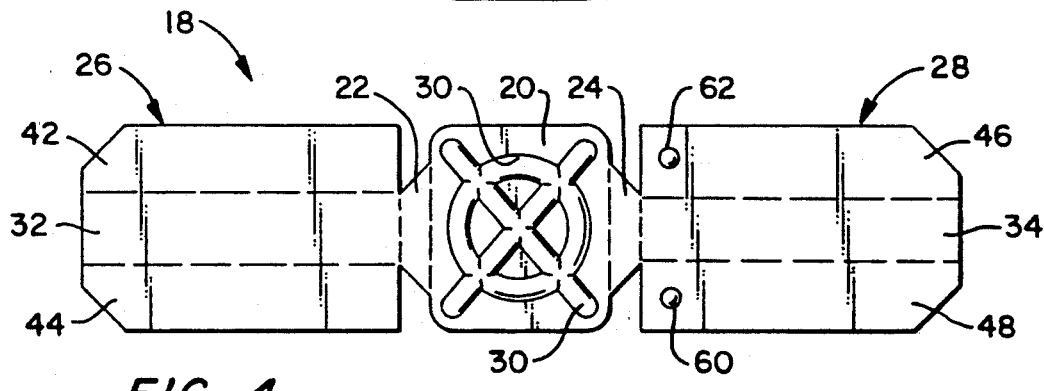
FIG. 4 is a top plan view of the fastener of FIG. 1 in an initial pre-finished configuration.

With reference to FIG. 4, the fastener 12 is preferably formed from a blank 18 of galvanized steel. The blank 18 is die cut to form a central head 20 and a pair of integral tapered hinge flaps 22 and 24 at opposing sides of the head. The hinge flaps 22 and 24 in turn integrally connect with legs 26 and 28, respectively.

In the illustrated embodiment, the head 20 has a rectangular shape with rounded corners which may, for example, be 1.00 inch by 1.13 inches. The head includes a plurality of indentations 30 which form an interconnected series of grooves. The indentations 30 function to reinforce the rigidity of the head and also to channel the flow of hot asphalt material which is conventionally applied to the head.

The legs 26 and 28 include back panels 32 and 34, respectively. Side panels 42, 44 and 46, 48 extend from respective panels 32 and 34 and are bent at right angles to form legs having a quasi-U-shaped section. The distal end portions of the legs 26, 28 terminate in edges which are angled to facilitate cutting through the covering sheet upon insertion. The hinge flaps 22, 24 are reverse folded against the underside of the head, and the legs extend downward in an interlocking-type relationship to form a tubular shank in the unactuated embodiments of FIGS. 1 and 2. The inward edges of legs 26, 28 have sloping surfaces which are curved so that upon downward forcing of the fastener into the roofing material, the legs essentially deflect apart to provide an efficient gripping with the roofing deck material. It will be appreciated that in an unactuated state, the legs essentially cooperate to form a tubular shank for the fastener.

Figure 3:
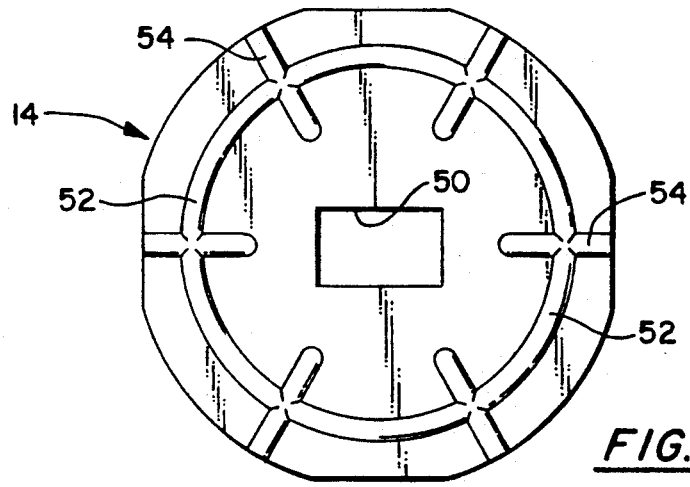
FIG. 3 is a top plan view of the retainer plate of FIG. 1.

With reference to FIG. 3, the retainer plate 14 has a quasi-circular periphery and includes a series of interconnected arcuate indentations 52 and radial indentations 54 to facilitate the flow of the hot asphalt material and enhance the gripping of the plate to the built-up roofing. The retainer plate also includes a rectangular opening 50 which is dimensioned to closely receive the tubular shank of the fastener in the unactuated mode.

The legs of the shank also include a pair of dimple-like transverse integral protrusions 60, 62 which extend outwardly at opposing sides of the shank. The protrusions 60, 62 are located at an upper portion of the shank. In one embodiment, the protrusions 60, 62 are substantially identical and protrude 0.55 inches from the side panels.

The shank of the fastener is inserted through the rectangular opening 50 so that the upper surface of the plate essentially engages against the underside surface of the head of the fastener. The opening 50 of the retainer plate and the protruding portion of the protrusions 60, 62 are dimensioned so that the protrusions engage against the edge defining portions of the opening to prevent the plate from dismounting from the fastener. Thus, the protrusions provide for a semi-permanent pre-assembled configuration of the base sheet plate and fastener.

Figure 1:
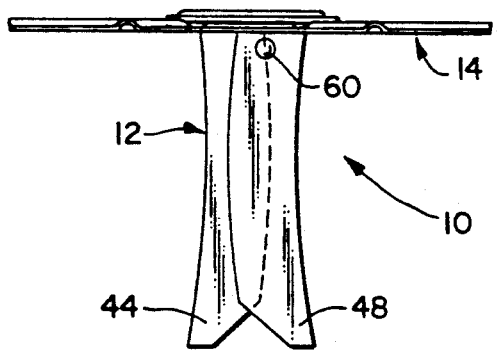
FIG. 1 is a side elevational view of a base sheet fastener-plate assembly in accordance with the present invention.
Figure 2:
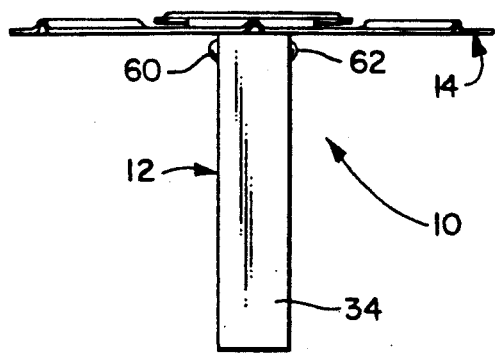
FIG. 2 is a side elevational view of the assembly of FIG. 1 viewed from the right side thereof.
Figure 5:
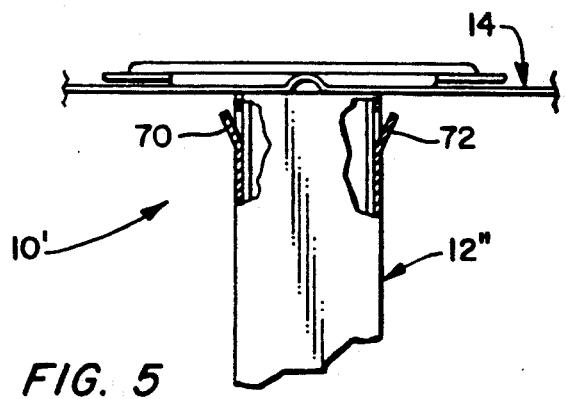
FIG. 5 is a fragmentary side elevational view, partly broken away and partly in section, of an alternate embodiment of a fastener in accordance with the present invention.

With reference to FIG. 5, a second embodiment of fastener 12' and assembly 10' employs barbs 70, 72 in place of the dimple protrusions 60, 62 illustrated in the FIGS. 1, 2 and 4. The retaining tabs or barbs 70, 72 are punched from the side panels. The barbs 70, 72 integrally extend to interfere with the retainer plate 14 to allow for the plate to be loosely retained with the fastener in a pre-assembled state prior to use on the roofing structure. In some embodiments only a single protrusion 60 or barb 70 is employed. Other protruding structures may also be employed. The foregoing fastener-plate assemblies 10 and 10' provide an efficient means for pre-assembling a plate with the fasteners 12 and 12' to thereby ensure a one-to-one correspondence with the separate fastener-plate components so that the assemblies may be efficiently used at the construction site.

While the preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fastener-plate assembly for anchoring a base ply to a roofing deck and the like comprising:
    retainer plate means comprising a plate and opening means defining a central opening having a pair of opposed edge portions;
    fastener means comprising a head and a pair of legs integrally hingeably connected to said head and extending from the underside of said head, said legs having a back panel and a pair of opposed side panels which are disposed in overlapping relationship to form a tubular shank, at least one leg being curved so that said leg is deflected transversely as said fastener is driven into the roofing deck;
    said tubular shank extending through said opening and at least one of said side panels comprising an integral transverse projection, so that said plate is retained to said shank by said head engaging said plate and said projection engaging one said edge portion of said plate.

2. The fastener-plate assembly of claim 1 wherein one leg has a projection on each said side panels.

3. The fastener-plate assembly of claim 1 wherein said opening is substantially rectangular.

4. The fastener-plate assembly of claim 1 wherein said projection has the form of a dimple.

5. The fastener-plate assembly of claim 1 wherein said projection is a barb.

6. The fastener-plate assembly of claim 1 wherein said projection is located at a position proximate the head.

7. A fastener-plate assembly for anchoring a base ply to a roofing deck and the like comprising:
    retainer plate means comprising a plate and opening means defining a central opening having a pair of opposed edge portions;
    fastener means comprising a head and a pair of legs integrally hingeably connected to said head and extending from the underside of said head, one said leg having a pair of opposed side panels, at least one of the legs being deflected transversely as said fastener is driven into the roofing deck;
    said tubular shank extending through said opening and at least one of said side panels comprising an integral transverse projection, so that said plate is retained to said shank by said head engaging said plate and said projection engaging one said edge portion of said plate.

8. The fastener-plate assembly of claim 7 wherein one leg has a projection on each of said side panels.

9. The fastener-plate assembly of claim 7 wherein said opening is substantially rectangular.

10. The fastener-plate assembly of claim 7 wherein said projection has the form of a dimple.

11. The fastener-plate assembly of claim 7 wherein said projection is a barb.

12. The fastener-plate assembly of claim 7 wherein said projection is located at a position proximate the head.

* * * * *